US010627986B2

United States Patent
Homma (10) Patent No.: US 10,627,986 B2
(45) Date of Patent: Apr. 21, 2020

(54) INFORMATION PROCESSING APPARATUS, METHOD FOR CONTROLLING INFORMATION PROCESSING APPARATUS, AND PROGRAM

(71) Applicant: CANON KABUSHIKI KAISHA, Tokyo (JP)

(72) Inventor: Takayuki Homma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 13/955,338

(22) Filed: Jul. 31, 2013

(65) Prior Publication Data
US 2014/0040825 A1    Feb. 6, 2014

(30) Foreign Application Priority Data

Aug. 2, 2012 (WO) .................. PCT/JP2012/069671

(51) Int. Cl.
*G06F 3/048* (2013.01)
*G06F 3/0481* (2013.01)
*G03G 15/00* (2006.01)

(52) U.S. Cl.
CPC ..... *G06F 3/04817* (2013.01); *G03G 15/5087* (2013.01); *G03G 2215/00109* (2013.01)

(58) Field of Classification Search
CPC .... G06F 3/04817; G06F 3/0481–0489; G03G 15/5087; G03G 2215/00109
See application file for complete search history.

(56) References Cited

U.S. PATENT DOCUMENTS

| 7,051,281 | B1* | 5/2006 | Yokota | H04N 1/00204 |
| | | | | 715/740 |
| 8,402,375 | B1* | 3/2013 | Skare | G06F 16/9562 |
| | | | | 715/738 |
| 9,094,545 | B2* | 7/2015 | Takamiya | H04N 1/0097 |
| 9,137,399 | B2* | 9/2015 | Sato | G06K 15/1803 |
| 2002/0004802 | A1* | 1/2002 | Shima | H04N 1/00464 |
| | | | | 715/234 |
| 2003/0016383 | A1* | 1/2003 | Culp et al. | 358/1.15 |
| 2006/0126110 | A1* | 6/2006 | Ohara | H04N 1/00209 |
| | | | | 358/1.15 |

(Continued)

FOREIGN PATENT DOCUMENTS

| JP | 2002-290643 A | 10/2002 |
| JP | 2003-005946 A | 1/2003 |

(Continued)

OTHER PUBLICATIONS

C Magazine: Programming Technique Information article, Oct. 2005, Publisher: Toshio Inaba, Copyright 2005 Softbank Publishing Inc., Tokyo.

(Continued)

*Primary Examiner* — Steven B Theriault
(74) *Attorney, Agent, or Firm* — Canon U.S.A., Inc. IP Division (57) ABSTRACT

An information processing apparatus and method for controlling the information processing apparatus includes creating instructions corresponding to processing for transmitting image data to an apparatus identified by a URL, obtaining icon data based on the URL, and setting the obtained icon data as an icon of the created instructions.

5 Claims, 9 Drawing Sheets

(56) References Cited

U.S. PATENT DOCUMENTS

| | | | | |
|---|---|---|---|---|
| 2007/0019227 A1* | 1/2007 | Hibino | ............... | H04N 1/32037 358/1.15 |
| 2009/0313579 A1* | 12/2009 | Poulson | .............. | G06F 16/9577 715/809 |
| 2010/0115430 A1* | 5/2010 | Skirpa | ................ | G06F 17/2247 715/760 |
| 2010/0115431 A1* | 5/2010 | Holte | ............................ | 715/760 |
| 2010/0146449 A1* | 6/2010 | Brown | ................ | G06F 9/45512 715/835 |
| 2010/0262645 A1* | 10/2010 | Brown | .................... | G06F 21/10 709/203 |
| 2011/0145688 A1* | 6/2011 | Han | ................. | H04M 1/72561 715/206 |
| 2011/0161807 A1* | 6/2011 | Choi | .................... | G06F 3/0486 715/255 |
| 2011/0307811 A1* | 12/2011 | Kim | ......................... | G06F 8/61 715/760 |
| 2012/0023451 A1* | 1/2012 | Kuroyanagi | ............ | G06F 8/38 715/835 |
| 2012/0124522 A1* | 5/2012 | Ookuma | ................ | G06F 3/04817 715/840 |
| 2012/0144329 A1* | 6/2012 | Sasaki | ................... | G06F 3/0482 715/764 |
| 2012/0307300 A1* | 12/2012 | Takano | .............. | H04N 1/00217 358/1.15 |
| 2013/0003100 A1* | 1/2013 | Miyazawa | ......... | H04N 1/00244 358/1.13 |
| 2013/0007593 A1* | 1/2013 | Ichimi | ................. | G06F 16/9577 715/234 |
| 2013/0125054 A1* | 5/2013 | Sato | ................... | H04N 1/00411 715/810 |
| 2016/0294846 A1* | 10/2016 | Sharov | ................... | G06F 21/51 |

FOREIGN PATENT DOCUMENTS

| | | |
|---|---|---|
| JP | 2004-288056 A | 10/2004 |
| JP | 2005-339027 A | 12/2005 |
| JP | 2008-029032 A | 2/2008 |
| JP | 2008-287425 A | 11/2008 |
| JP | 2011-019090 A | 1/2011 |
| JP | 2011-123897 A | 6/2011 |
| JP | 2012-103990 A | 5/2012 |

OTHER PUBLICATIONS

C Magazine, The Development of Sleipnir 2.00 the Design and Structure of Browser, Oct. 1, 2005, vol. 17, No. 10, p. 4.

* cited by examiner

FIG. 10

INFORMATION PROCESSING APPARATUS, METHOD FOR CONTROLLING INFORMATION PROCESSING APPARATUS, AND PROGRAM

TECHNICAL FIELD

Aspects of the present invention generally relate to an information processing apparatus that sets icons to be displayed on an operation screen.

BACKGROUND ART

Digital multifunction peripherals having a plurality of functions such as a scanning function, a printing function, a network transmission function, and a web browser function are widely known. Such digital multifunction peripherals display "icons" indicating the functions thereof on screens of operation panels in order to enable users to easily understand the functions. In PTL 1, a technique that enables a user to select an icon that suits the taste of the user from among several patterns of icons registered in a management system in advance is disclosed.

In addition, the following digital multifunction peripheral is known. That is, a digital multifunction peripheral is known in which "instructions" in which one or a plurality of processing procedures are described are registered in the apparatus in advance and that, when the registered instructions have been called, executes processing in accordance with set values described in the instructions. For example, instructions in which a series of processing procedures, that is, a paper document is scanned, image processing is performed on obtained image data, and the image data is transmitted to an external apparatus, is described may be registered. If such instructions are registered, processing from scanning to transmission may be automatically executed in accordance with scanning setting, image processing setting, and transmission setting described in the instructions when the instructions have been called.

CITATION LIST

Patent Literature

PTL 1 Japanese Patent Laid-Open No. 2003-5946

In the related art, however, when the above-described instructions are to be registered in an apparatus, a preferable icon is selected only from among icons registered in a management system in advance. That is, it has been difficult to obtain an icon of instructions from an external apparatus and use the icon. Therefore, when registered instructions are instructions that use external services, it has been difficult for the user to know that.

SUMMARY

In order to address the above issue, an aspect of the present invention generally provides an apparatus for obtaining an icon of instructions to be displayed on a screen from the outside and setting the icon.

An aspect of the present invention includes an information processing apparatus including a memory and a processing unit in communication with the memory, the processing unit configured to create instructions corresponding to a process for transmitting image data to an apparatus identified by a URL, obtaining icon data based on the URL, and setting the obtained icon data as an icon of the created instructions.

Further features of the present disclosure will become apparent from the following description of exemplary embodiments with reference to the attached drawings.

DESCRIPTION OF EMBODIMENTS

Exemplary embodiments will be described hereinafter with reference to the drawings.

First Embodiment

A first embodiment will be described with reference to FIGS. 1 to 7.

Figure 1:
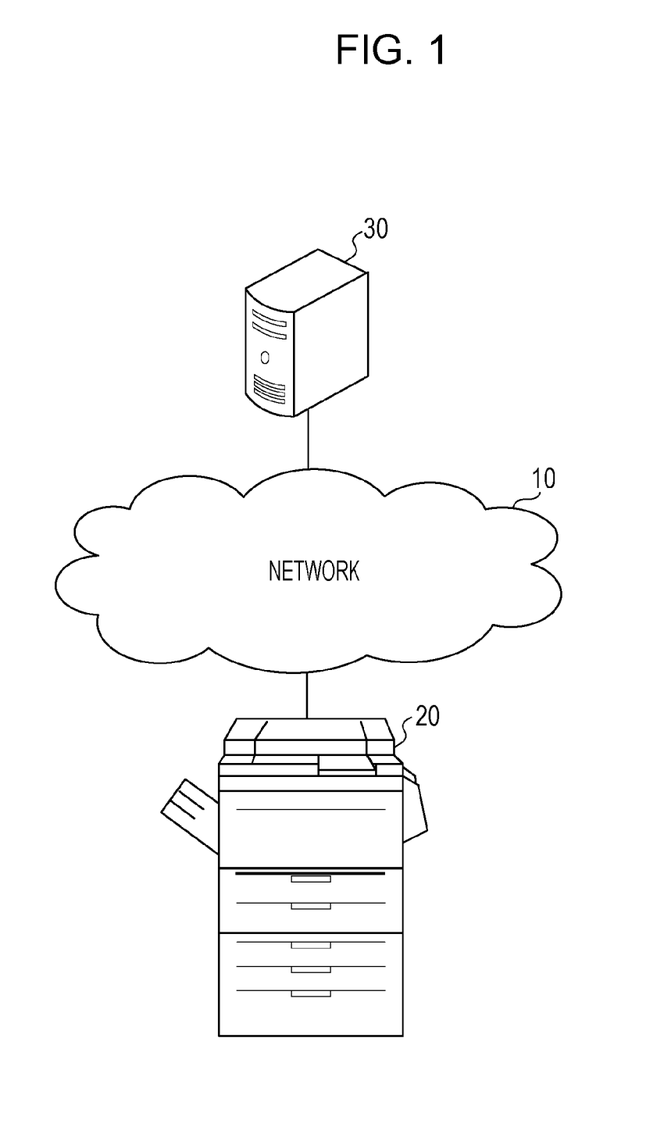
FIG. 1 is a diagram illustrating the configuration of a network including a multifunction peripheral and an application server.

FIG. 1 is a diagram illustrating a network system according to the first embodiment. The system illustrated in FIG. 1 is includes a digital multifunction peripheral 20 (hereinafter referred to as an MFP), which is an example of an information processing apparatus, and an application server 30. These apparatuses are connected to a network 10, such as Ethernet®.

The MFP 20 includes a user interface (hereinafter referred to as a UI), and is capable of creating and executing instructions, which are described below. In addition, the MFP 20 has a network communication function by which the MFP 20 is able to communicate with the application server 30. In the present embodiment, an MFP having a scanning function, an image processing function, a printing function, and the network communication function will be described as an example of the information processing apparatus. A personal computer (hereinafter referred to as a PC) may be applied as the information processing apparatus according to the present embodiment. The scanning function is a function of scanning an original document and inputting image data. The image processing function is a function of processing and correcting image data. The printing function is a function of printing an image on a recording medium.

The network communication function is a function of communicating with an external apparatus through a network.

The application server 30 is a server that provides a service according to a request from the MFP 20. Examples of a service to be provided include accumulation, editing, and printing of image data transmitted from a client. In addition, there is also a service for providing data accumulated in a storage in accordance with a data obtaining request from a client and the like.

The application server 30 also functions as a web server, and may respond to the MFP 20 by generating a web page in accordance with a request from the MFP 20.

Figure 2:
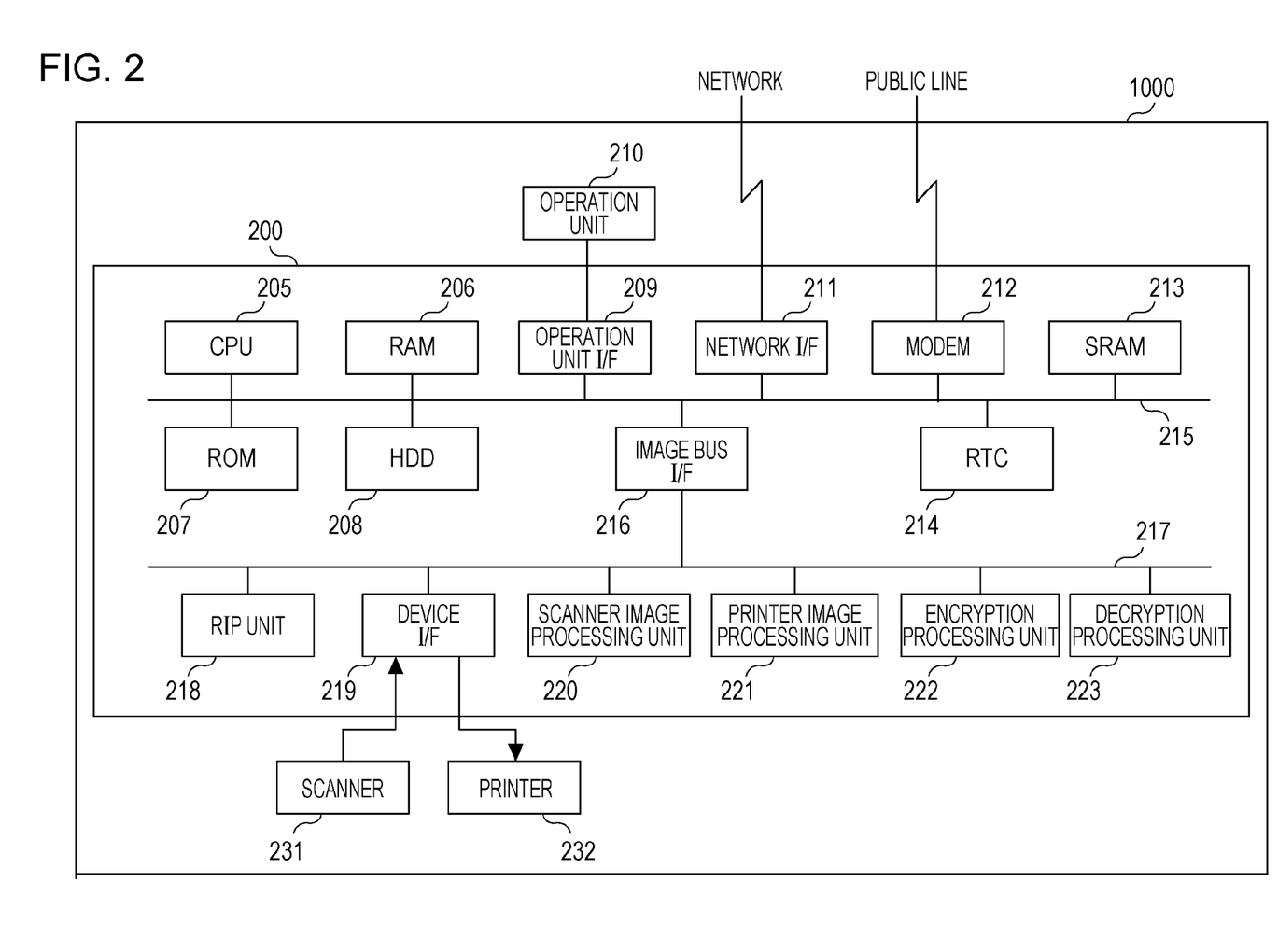
FIG. 2 is a diagram illustrating the hardware configuration of the multifunction peripheral.

FIG. 2 is a diagram illustrating the hardware configuration 1000 of the MFP 20 illustrated in FIG. 1.

A control unit 200 is connected to a scanner 231, which is an image input device, and a printer 232, which is an image output device. The control unit 200 is also connected to the network 10 and a public line, and receives and outputs information from and to external apparatuses.

A CPU 205 is a processor that controls the MFP 20. A RAM 206 is a system working memory for enabling the CPU 205 to operate, and a memory for temporarily storing image data and the like. A ROM 207 is a boot ROM, and stores a boot program of the system. An HDD 208 is a hard disk drive, and stores system software, applications, and image data. A program for executing flowcharts according to the present embodiment, which is described below, is also stored in the HDD 208. Programs stored in the HDD 208 are loaded into the RAM 206 and executed by the CPU 205.

Each step of the flowcharts according to the present embodiment is executed by the CPU 205. However, a processor other than the CPU 205 may execute each step of the flowcharts according to the present embodiment, or the CPU 205 may execute each step of the flowcharts according to the present embodiment in combination with another processor.

An operation unit interface 209 is an interface unit connected to an operation unit 210 including a liquid crystal touch panel, and outputs image data to be displayed on the operation unit 210 to the operation unit 210. In addition, the operation unit interface 209 transmits information input by a system user (user) using the operation unit 210 to the CPU 205. A network interface 211 is connected to the network 10, and, for example, receives and outputs information from and to a PC 2000. A modem 212 is connected to the public line, and, for example, converts digital signals into analog signals. An SRAM 213 is a non-volatile recording medium capable of operating at high speed. An RTC 214 is a real-time clock, and performs a process for keeping the current time even when power is not supplied to the control unit 200. The above-described devices are provided on a system bus 215.

An image bus I/F 216 is a bus bridge that connects the system bus 215 and an image bus 217 for transferring image data at high speed to each other and that converts a data structure. The image bus 217 can be configured by a PCI bus or IEEE 1394. The following devices are provided on the image bus 217.

An RIP unit 218 is a raster image processor, and expands a PDL code into a bitmap image. A device I/F unit 219 connects the scanner 231 and the printer 232 to the control unit 200, and converts image data between synchronous and asynchronous. A scanner image processing unit 220 corrects, processes, and edits input image data. A printer image processing unit 221 performs printer correction of the printer, conversion of resolution, and the like on print output image data. An encryption processing unit 222 performs a process for encrypting input data including image data. A decryption processing unit 223 performs a process for decrypting encrypted data.

Figure 3:
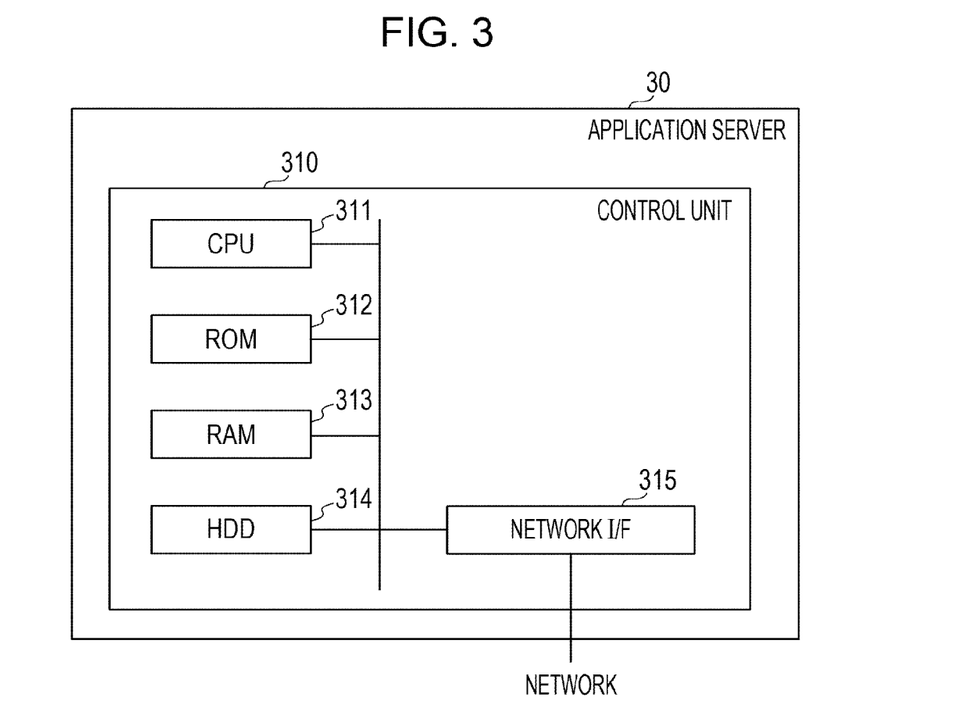
FIG. 3 is a diagram illustrating the hardware configuration of the application server.

FIG. 3 is a diagram illustrating the hardware configuration of the application server 30 illustrated in FIG. 1. A control unit 310 including a CPU 311 controls the operation of the application server 30. The CPU 311 executes various control processes by reading control programs stored in a ROM 312. A RAM 313 is used as a temporary storage region such as a main memory or a work area of the CPU 311. An HDD 314 stores image data and various programs.

A network I/F 315 connects the control unit 310 (application server 102) to a LAN 110. The network I/F 315 communicates various pieces of information with other apparatuses on the LAN 110.

Figure 4:
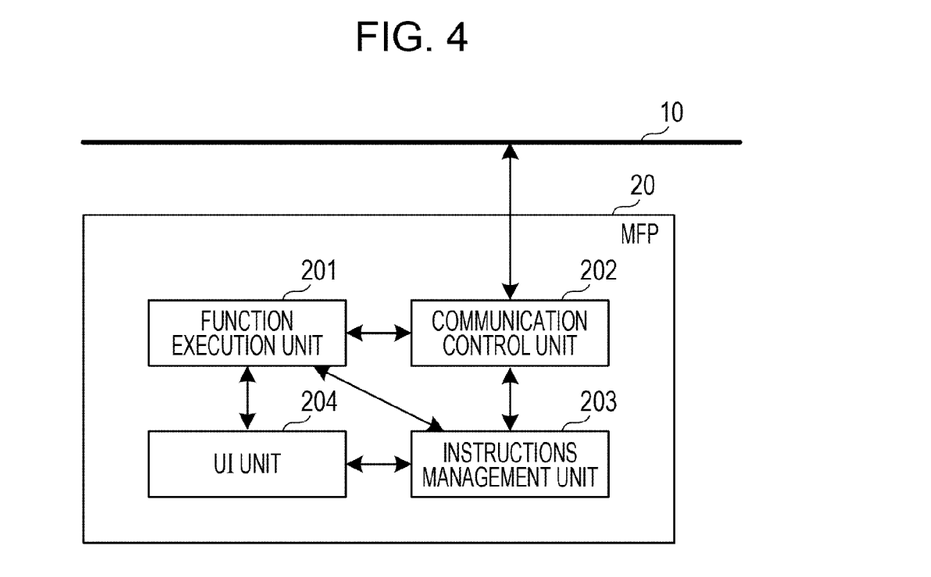
FIG. 4 is a diagram illustrating the software configuration of the multifunction peripheral.

FIG. 4 is a diagram illustrating the software configuration of the MFP 20 illustrated in FIG. 1. In the present embodiment, the software illustrated in FIG. 4 is stored in the HDD 208 illustrated in FIG. 2, loaded into the RAM 206, and executed by the CPU 205.

The MFP 20 includes software modules including a function execution unit 201, a communication control unit 202, a CPU 205, and a UI unit 204.

The UI unit 204 displays the state of the MFP 20, an operation menu, and the like and detects inputs made by the user on the displayed content. The UI unit 204 controls the operation unit 210 and the operation unit interface 209.

The function execution unit 201 executes the scanning function, the image processing function, the printing function, a copying function, and the network communication function of the MFP 20 and the like. More specifically, the function execution unit 201 controls hardware resources such as the scanner image processing unit 220, the printer image processing unit 221, the scanner 231, the printer 232, and the network interface 211.

The CPU 205 controls creation, storage, and execution of instructions for executing jobs by combining the functions of the MFP 20. The instructions in the present embodiment represent data in which a plurality of processing procedures are described, and are created by the MFP 20 based on the instructions issued by the user. In the present embodiment, the instructions are written as a structured document using eXtensible Markup Language (XML) or the like illustrated in FIG. 5. In particular, the instructions in the present embodiment include URLs (Uniform Resource Locators), and processes for transmitting image data to external apparatuses (for example, web servers) identified by the URLs are described. That is, the instructions may be regarded as instructions to enable the MFP 20 to perform processing in combination with external apparatuses.

The communication control unit 202 enables communication between the MFP 20 and other apparatuses in the network 10.

Figure 5:
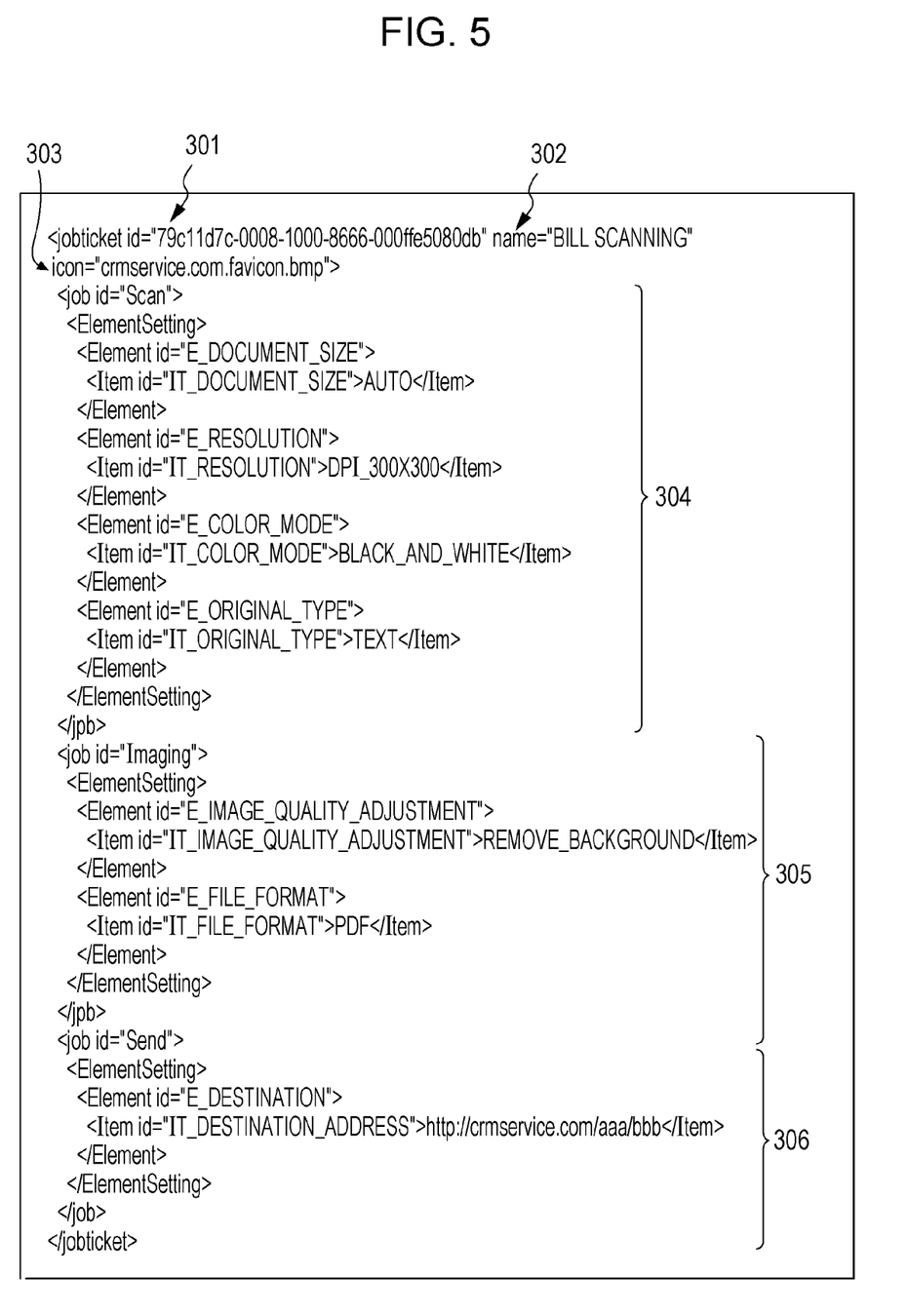
FIG. 5 is a diagram illustrating an example of instructions created by instructions issued by a user.

FIG. 5 is a diagram illustrating an example of the instructions created by the MFP 20 according to the present embodiment in accordance with instructions issued by the user.

The instructions include ID information 301, name information 302, icon information 303, scanning setting 304, image processing setting 305, and transmission setting 306.

The instructions illustrated in FIG. 5 indicate processing in which image data obtained by scanning a document using settings described in the scanning setting 304 is subjected to image processing using settings described in the image processing setting 305 and the data is transmitted using settings described in the transmission setting. When the user has selected these instructions, the MFP 20 executes functions in accordance with the settings described in the instructions.

The ID information 301 is information regarding the control number of instructions for which a UUID is used. The name information 302 is information regarding the title of instructions. A character string described in the name information 302 is displayed as the name of an instructions button illustrated in FIG. 5, which is described below.

The icon information 303 is the name of a symbol icon indicating the content of instructions. More specifically, the icon information 303 is the file name of icon data obtained by executing a process for obtaining an icon illustrated in FIGS. 7 and 8, which is described below. In the scanning setting 304, setting of a scanning job to be executed by the MFP 20 is described. In the example illustrated in FIG. 5, document size: automatic, resolution: 300×300 dpi, color mode: black/white binary, and document type: text are described in the scanning setting 304 as settings.

In the image processing setting 305, setting of an image processing job to be executed by the MFP 20 is described. In the example illustrated in FIG. 5, processing: removal of background color and file format of image data: PDF are described in the image processing setting 305 as settings.

In the transmission setting 306, setting of a transmission job to be executed by the MFP 20 is described. In the example illustrated in FIG. 5, a URL "http://crmservice.com/aaa/bbb" is described in the transmission setting 306 as the destination of data. This URL is a URL to be used when a file is uploaded by accessing a web server (application server 30) or the like in accordance with the HTTP (Hyper-Text Transfer Protocol). When a file is to be uploaded in accordance with the FTP (File Transfer Protocol), a URL beginning with "ftp:" is used, and when a file is to be transmitted as electronic mail data, a URL beginning with "mailto:" is used.

Figure 6:
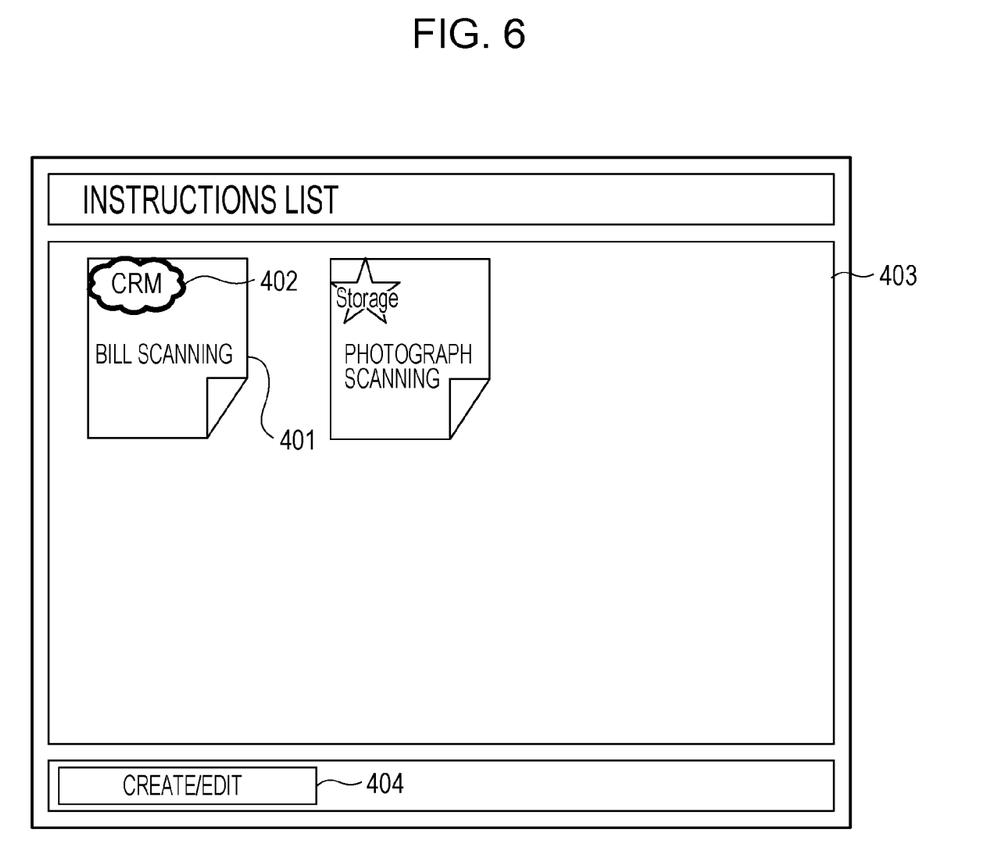
FIG. 6 is a diagram illustrating an example of a list of instructions displayed by an operation unit of the multifunction peripheral.

FIG. 6 is a diagram illustrating an example of a list of instructions displayed on the operation unit 210.

An instructions list screen illustrated in FIG. 6 includes an instructions display area 403, instructions buttons 401, and a create/edit button 404. Each of the instructions buttons 401 includes a symbol icon 402 indicating the content of corresponding instructions.

The instructions display area 403 is a display area in which the plurality of instructions buttons 401 may be displayed.

Each of the instructions buttons 401 is an image of corresponding instructions. The CPU 205 detects an instructions button selected by the user, and executes the selected instructions. For example, when the user has selected an instructions button of bill scanning illustrated in FIG. 6, jobs according to the instructions illustrated in FIG. 5 are executed.

Each of the symbol icons 402 is an icon indicating instructions set during creation of the instructions.

The create/edit button 404 is a button for issuing an instruction to create instructions. When the create/edit button 404 has been selected by the user, an instructions management unit 203 executes a process for creating instructions. More specifically, an instructions creation screen created by the instructions management unit 203 is displayed by the UI unit 204 on the liquid crystal touch panel of the operation unit 210. Instructions are created by repeating a process in which, upon receiving an instruction from the user, the UI unit 204 transmits an operation performed by the user to the instructions management unit 203, information regarding the operation performed by the user is saved, and a UI that has received the operation performed by the user is transmitted to the UI unit 204. While the present embodiment describes instructions created using the MFP 20, this description is not limiting. Instructions may be created using an apparatus other than the MFP 20.

Upon receiving an instruction to create instructions from the user, the instructions management unit 203 creates instructions such as those illustrated in FIG. 5 described in XML, and executes a process for obtaining an icon, which serves as a symbol of the instructions.

The process for obtaining an icon will be described hereinafter with reference to FIGS. 7 and 8.

Figure 7:
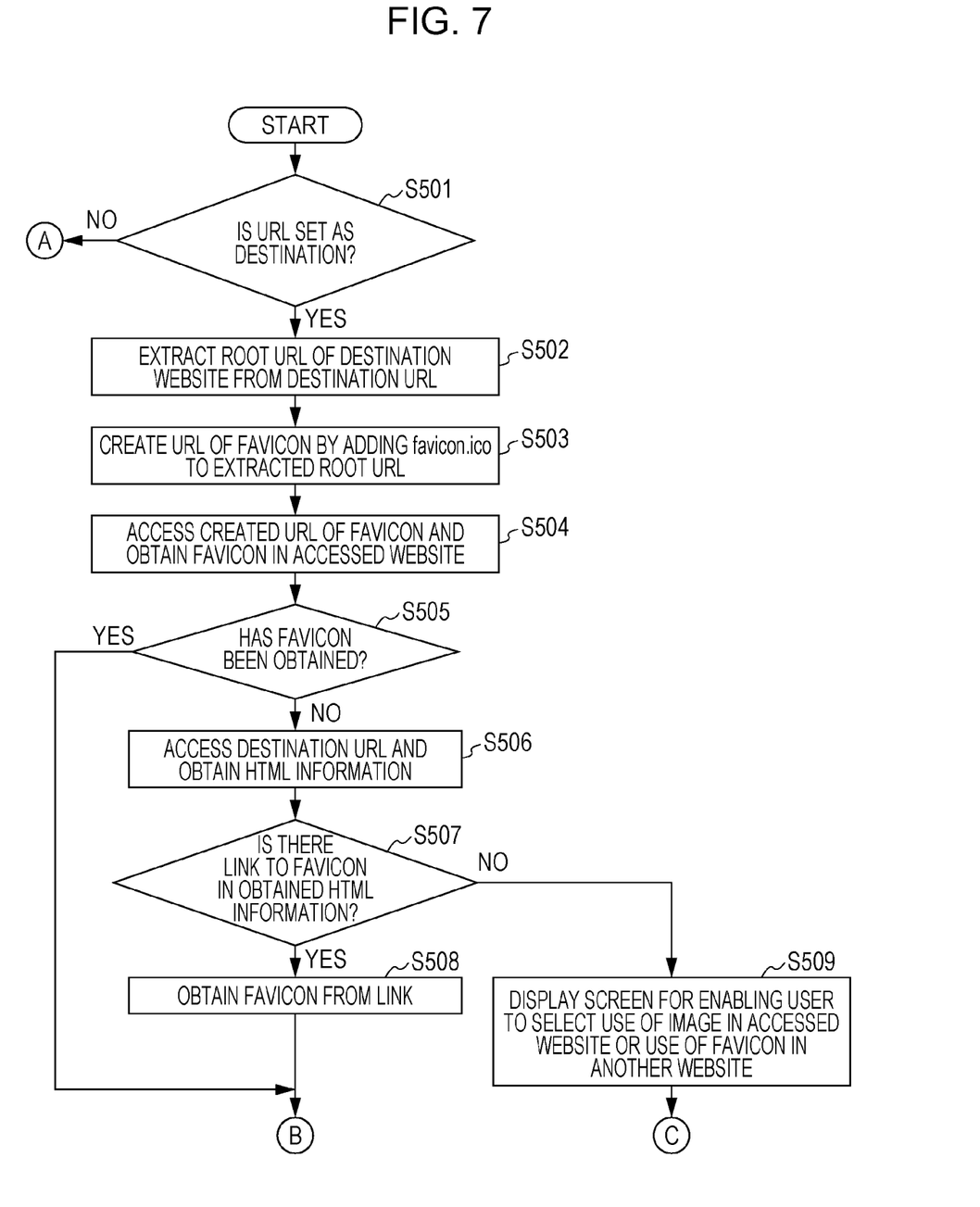
FIG. 7 is a diagram illustrating a flowchart of a process for obtaining an icon executed by the multifunction peripheral.
Figure 8:
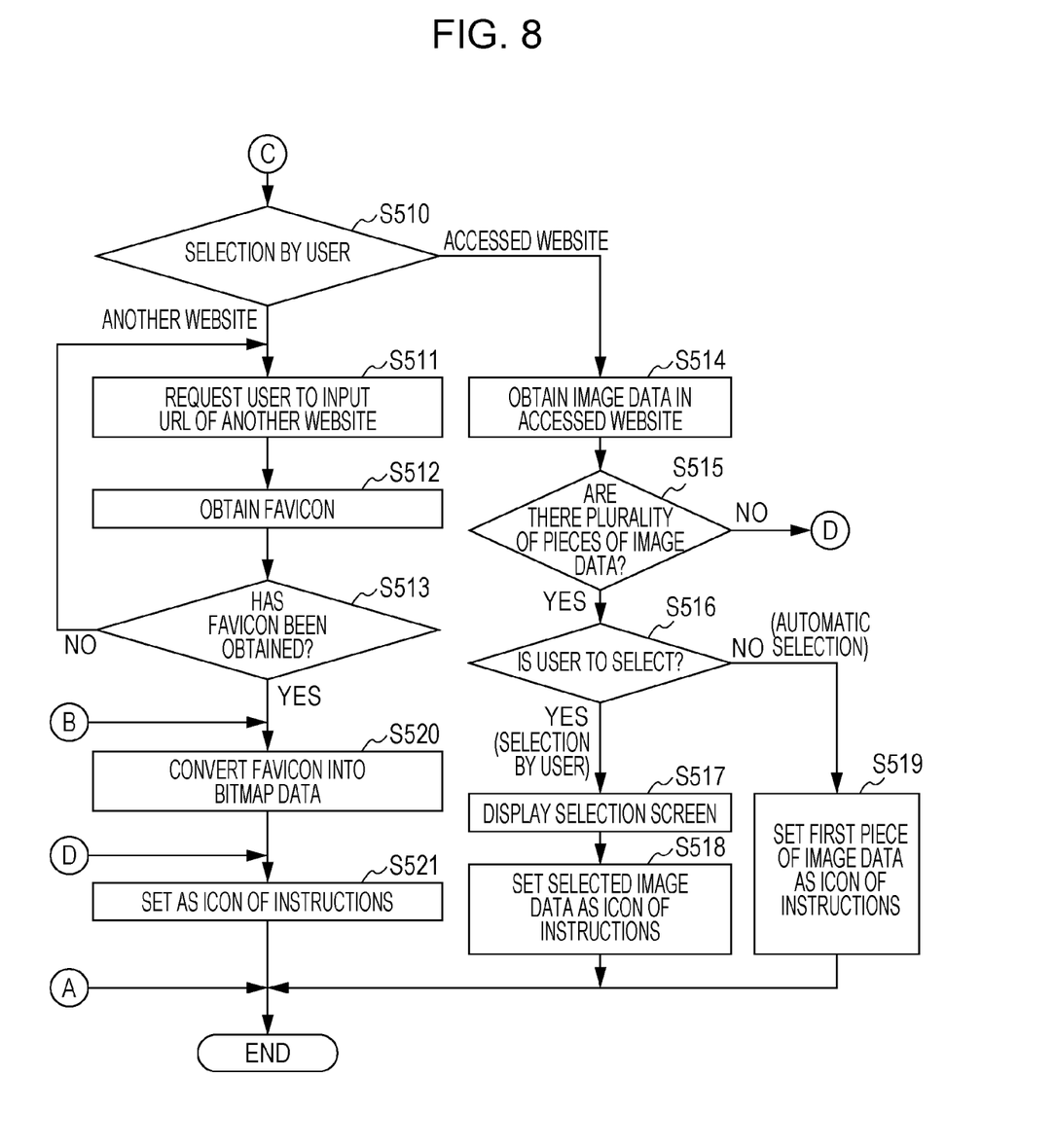
FIG. 8 is a flowchart illustrating a continuation of FIG. 7.

FIGS. 7 and 8 are diagrams illustrating flowcharts of the process for obtaining an icon executed by the MFP 20 according to the present embodiment. A program for executing the flowcharts of FIGS. 7 and 8 is stored in the HDD 208, loaded into the RAM 206, and executed by the CPU 205.

In S501, the CPU 205 checks the destination of data described in the transmission setting 306 of instructions. As a result of the check, if a URL beginning with a character string "http:" is described in the instructions as the destination of data (YES in step S501), the process proceeds to step S502. On the other hand, if a URL beginning with a character string other than "http:" is described or if the processing procedures of the instructions do not include a process for transmitting data to a server, the process for obtaining an icon ends. If the result of step S501 is NO, an image stored in the MFP 20 in advance is set as an icon of the instructions. For example, if transmission of an electronic mail is set as the transmission setting 306 described in the instructions, an icon indicating transmission of an electronic mail is set as the icon of the instructions.

In step S502, the CPU 205 extracts the root directory of an accessed website identified by the URL described in the transmission setting 306. For example, in the case of the instructions illustrated in FIG. 5, the root directory is a portion of "http://crmservice.com/aaa/bbb" except for "aaa/bbb", that is, "http://crmservice.com/".

In step S503, the instructions management unit 203 adds a character string "facivon.ico" to the root directory extracted in step S502 to create a URL "http://crmservice.com/favicon.ico". "favico.ico" is the file name of icon data called "favicon" held by a web server. "Favicon" is an abbreviation for "favorite icon". A favicon is normally an icon displayed in a URL display field or the like when a web browser has accessed a website and displayed a web page. In addition, when a web browser displays a plurality of web pages using a tab format (when the web browser is a so-called tab browser), corresponding favicons are displayed in tabs. In addition, when a website has been registered as a bookmark (also referred to as a favorite), a favicon is used as an icon of the bookmark.

In step S504, the CPU 205 accesses the URL created in step S503 and tries to obtain a favicon (icon data).

In step S505, the CPU 205 checks a result of execution of step S504, and if a favicon (icon data) has been obtained, the process proceeds to step S520, and if a favicon (icon data) has not been obtained, the process proceeds to step S506.

In step S521, the CPU 205 converts the data format of the obtained favicon (icon data) from an ICO format to a BMP format. For example, when a facivon (icon data) indicated by "crmservice.com.favicon.ico" has been obtained, data of "crmservice.com.favicon.bmp" is created by executing the conversion process in S521. In S521, the CPU 205 sets the favicon (icon data) converted into the BMP format as the icon of the instructions. For example, when data of "crmservice.com.favicon.bmp" has been created in S521, the favicon (icon data) is set as the icon of the instructions by writing "crmservice.com.favicon.bmp" to the item of the icon information 303 of the instructions.

In step S506, the CPU 205 tries to access a web page provided by a website indicated by the URL described in the transmission setting 306. In the example of the instructions illustrated in FIG. 5, a character string "index.html" is added to the URL described in the transmission setting of the data to create a URL "http://crmservice.com/aaa/bbb/index.html". The CPU 205 then tries to access "http://crmservice.com/aaa/bbb/index.html", which is the created URL. If there is HTML data corresponding to "http://crmservice.com/aaa/bbb/index.html" in the website, the HTML data is obtained. The process then proceeds to step S507. On the other hand, if HTML data corresponding to "http://crmservice.com/aaa/bbb/index.html" is not obtained in a certain period of time, it is determined that HTML data corresponding to the URL does not exist in the website. The CPU 205 adds the character string "index.html" to a level higher than "http://crmservice.com/aaa/bbb/" by one level, that is, "http://crmservice.com/aaa" to create a URL "http://crmservice.com/aaa/index.html", and tries to access the URL. If HTML data corresponding to this URL does not exist either, the CPU 205 adds the character string "index.html" to the root directory of an accessed web server, and tries to access "http://crmservice.com/index.html".

In step S507, the CPU 205 analyzes the HTML data obtained in step S506, and if there is information regarding a link to a favicon in the HTML data, the process proceeds to step S508. If there is no information regarding a link in the obtained HTML data in step S507, the process proceeds to step S509. The determination whether there is information regarding a link to a favicon is made by determining whether the character string "favicon.ico" is included in a character string sandwiched by <a> tags, which indicate a link to another web page.

In step S508, the CPU 205 accesses the URL of the link to the favicon and obtains the favicon, and the process proceeds to step S520.

In step S509, the CPU 205 displays, on the operation unit 210, a screen for enabling the user to select either use of an image in the accessed website or use of a favicon (icon data) in another website, and provides the screen for the user. The CPU 205 then waits for an instruction from the user. When the CPU 205 has received an instruction from the user through the operation unit 210, the process proceeds to step S510.

In step S510, the CPU 205 checks the content of the instruction from the user. If the instruction from the user indicates another website, the process proceeds to step S511, and if the instruction from the user indicates the accessed website, the process proceeds to step S514.

In step S511, the CPU 205 displays, on the operation unit 210, a screen for requesting input of the URL of another website in which the user desires to obtain a favicon (icon data). The CPU 205 then waits for an instruction from the user. When the CPU 205 has received an input from the user through the operation unit 210, the process proceeds to step S512.

In step S512, the CPU 205 tries to obtain a favicon (icon data) from the URL input by the user.

In step S513, the CPU 205 checks a result of the processing in step S512. If a favicon (icon data) has been obtained, the process proceeds to step S520, and if a favicon (icon data) has not been obtained, the process returns to step S511. If a fvicon cannot be obtained even when steps S511 to S513 have been repeated a plurality of times, the process illustrated in FIGS. 7 and 8 ends, and a predetermined image may be set as the icon of the instructions.

In step S514, the CPU 205 extracts information regarding a link to an image file from HTML data in a top page of the accessed website indicated by the destination URL, and obtains the image file in the link.

Next, in step S515, the CPU 205 determines whether there are a plurality of obtained image files. If the CPU 205 determines that there are a plurality of obtained image files (YES in step S515), the process proceeds to step S516. On the other hand, if the CPU 205 determines that there is one obtained image file, the process proceeds to step S521.

In step S516, the CPU 205 determines whether to automatically select an image file to be set as the icon or to make the user select an image file from the plurality of obtained image files. If the CPU 205 determines that an image file is to be automatically selected, the process proceeds to step S519, and if the CPU 205 determines that an image file is to be selected by the user, the process proceeds to step S517.

In step S517, the CPU 205 displays, on the operation unit 210, a screen in which the plurality of image files obtained in step S514 are arranged and that makes the user select an image file to be used as the icon, and waits for an instruction from the user. When the CPU 205 has received an input from the user through the operation unit 210, the process proceeds to step S518.

In step S518, the CPU 205 sets the image file selected by the user as the icon indicating the content of the instructions. More specifically, the name of an obtained image file is written to the instructions as the icon information 303.

In step S519, the CPU 205 analyzes the HTML data obtained in step S514 in descending order, and when a first link to an image file has been found, the CPU 205 sets an image obtained from the link as the symbol icon of the instructions and ends the process. In addition, in S518 or S519, the data size of the image to be set as the icon may be reduced or the resolution or the number of colors may be changed as necessary.

The operations for obtaining an icon and setting the icon according to the first embodiment have been described above.

According to the present embodiment, when the content described in the instructions includes a process for transmitting a file to an application server using the HTTP, a favicon held by the application server may be set as the icon of the instructions. Therefore, the type of execution of processing based on the instructions may be easily checked based on the icon of the instructions displayed on the operation unit 210. That is, it is easy to check with the icon of the instructions that processing to be executed when the instructions have been called includes a process for uploading a file to a web server identified by the favicon.

In addition, according to the present embodiment, an icon desired by the user may be used even if a large number of icons are not prepared in the MFP.

Second Embodiment

In a second embodiment, an apparatus that creates instructions and an apparatus that executes the instructions are separately prepared in order to provide the same environment in terms of instructions even if the user changes an apparatus to be used.

An information processing apparatus according to the second embodiment will be described with reference to FIGS. 9 and 10.

Figure 9:
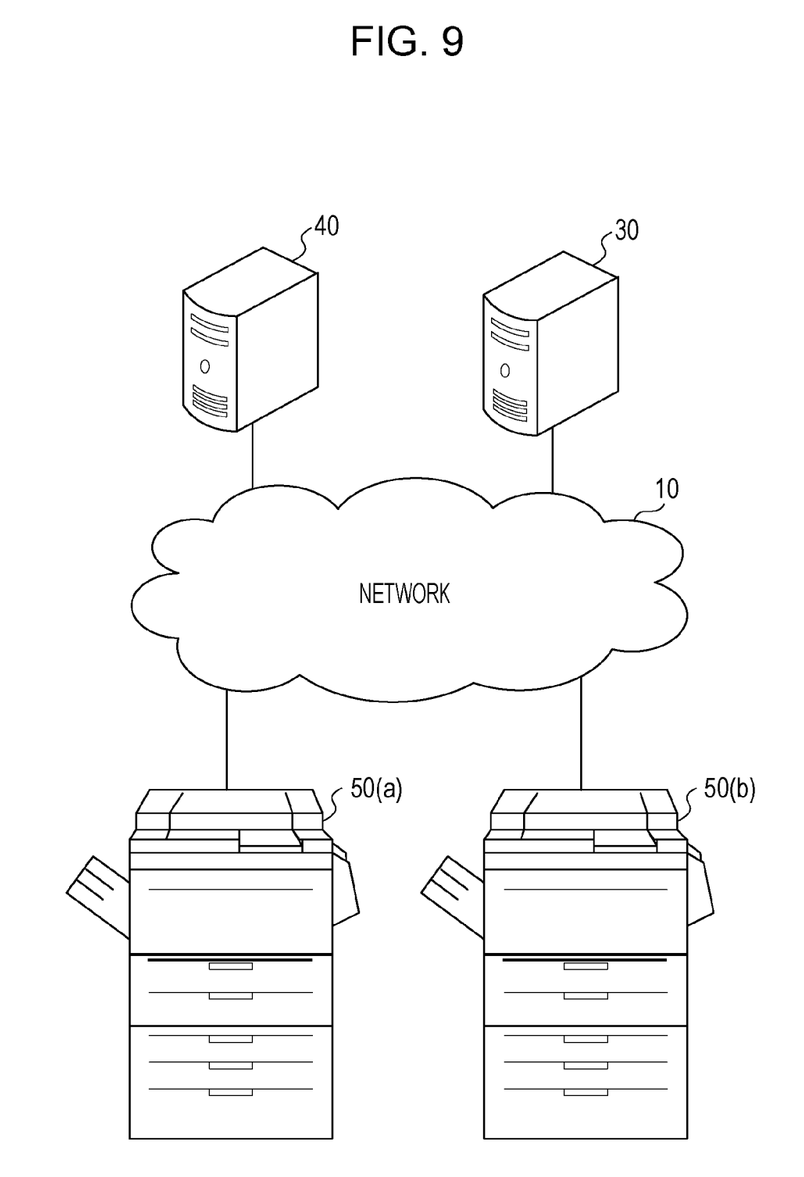
FIG. 9 is a diagram illustrating the configuration of a network including multifunction peripherals, an application server, and an instructions management apparatus according to a second embodiment.

FIG. 9 is a diagram illustrating a network system that stores the information processing apparatus according to the second embodiment. The system illustrated in FIG. 9 includes an instructions management apparatus 40, one or a plurality of MFPs 50, and an application server 30, and these apparatuses are connected to a network 10 such as Ethernet®.

The instructions management apparatus 40 is a server that provides created instructions in accordance with a request from the outside. The MFPs 50(a) and 50(b) are examples of an instructions creation apparatus. The MFPs 50(a) and 50(b) are the same apparatuses, and the hardware configuration thereof is the same as that according to the first embodiment illustrated in FIG. 2. In addition, the hardware configuration of the instructions management apparatus 40 is the same as that according to the first embodiment illustrated in FIG. 3.

The MFP 50 is an apparatus that includes a UI that creates and obtains instructions using a service provided by the instructions management apparatus 40, and that has a function of executing the obtained instructions and the network communication function.

The instructions management apparatus 40 may be a PC on which a UI program, a processing instructions creation program, a processing instructions execution program, and a network communication program are installed. When a document processing system used in an office is assumed, however, a digital MFP having an information processing function, the network communication function, a function of optically reading an original document and creating image data, a function of correcting image data, and the like may be used as the instructions management apparatus 40.

The application server 30 is a server that provides a service according to a request from the outside. Examples of a service to be provided include a customer relationship management service and an online storage service.

Figure 10:
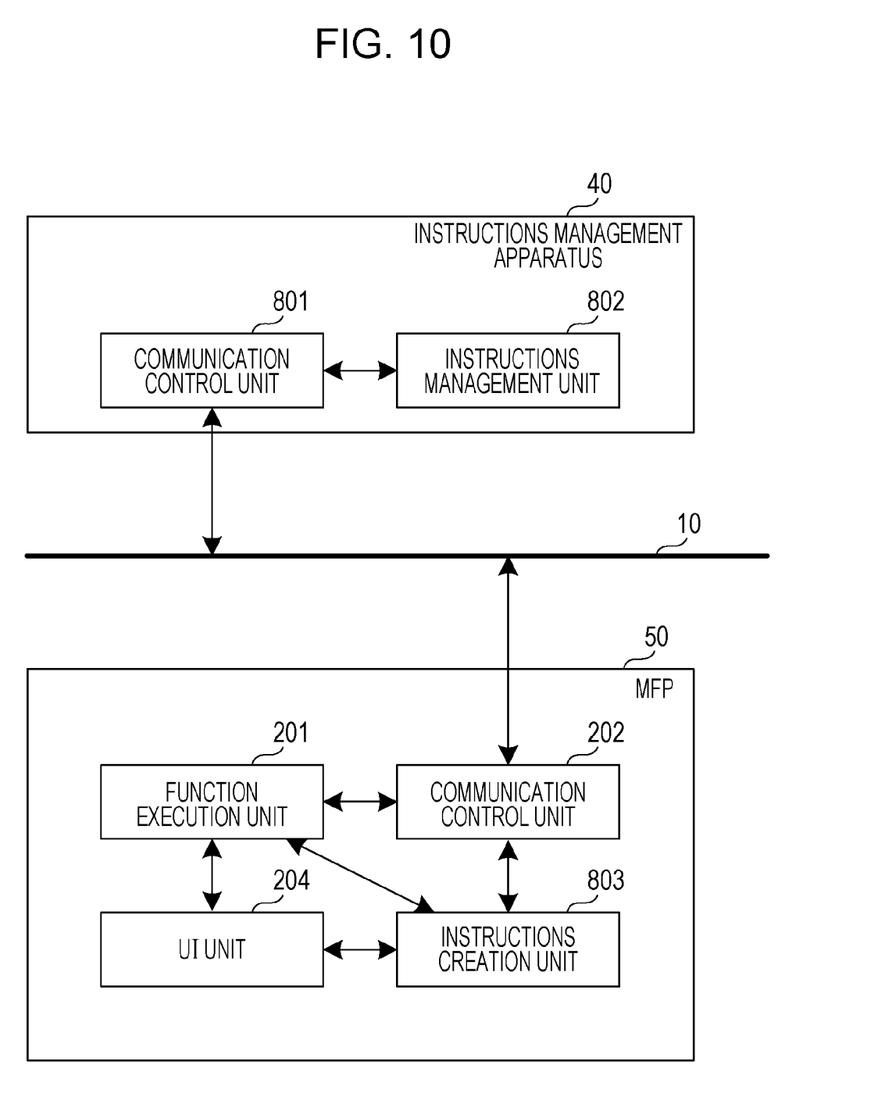
FIG. 10 is a diagram illustrating the software configurations of the multifunction peripheral and the instructions management apparatus.

FIG. 10 is a diagram illustrating the software configurations of the instructions management apparatus 40 and the MFP 50 illustrated in FIG. 9.

First, the software configuration of the MFP 50 will be described.

The MFP 50 includes software modules including a function execution unit 201, a communication control unit 202, an instructions creation unit 803, and a UI unit 204. The software modules described here are programs stored in an HDD 208. The programs are loaded into a RAM 206 and executed by a CPU 205.

The UI unit 204 displays the state of the MFP 50, an operation menu, and the like and receives selection and parameter inputs made by the user on the displayed content. The UI unit 204 controls an operation unit 210 including a liquid crystal touch panel and a numeric keypad.

The function execution unit 201 executes the functions of the MFP 50. More specifically, the function execution unit 201 includes function modules that realize the scanning function, the printing function, the copying function, an image information transmission function, and the like. In this case, the function execution unit 201 controls hardware resources such as a scanner 231, a printer 232, an RIP unit 218, a scanner image processing unit 220, and a printer image processing unit 221.

The instructions creation unit 803 creates and obtains instructions using a service provided by the instructions management apparatus 40 and that controls execution of the obtained instructions.

The communication control unit 202 enables communication between the MFP 50 and another apparatus (e.g., the instructions management apparatus 40 in the example illustrated in FIG. 8) in the network 10.

Next, the software configuration of the instructions management apparatus 40 will be described.

The instructions management apparatus 40 includes software modules including a communication control unit 801 and an instructions management unit 802. The software modules described here are programs stored in an HDD 314 of the instructions management apparatus 40. These programs are loaded into a RAM 313 and executed by a CPU 311.

The communication control unit 801 enables communication between the instructions management apparatus 40 and another apparatus (e.g., the MFP 50 in the example illustrated in FIG. 8) in the network 10.

The instructions management unit 802 controls management of instructions and the like.

Display and creation of instructions are essentially the same as those in the first embodiment, and accordingly description thereof is omitted herein.

A difference from the first embodiment is that created instructions are managed by the instructions management apparatus 40 connected to the network.

That is, instructions created by the instructions creation unit 803 are transmitted to the instructions management unit 802 of the instructions management apparatus 40 through the communication control units 202 and 801. When instructions are to be called, instructions managed by the instructions management unit 802 are obtained by the function execution unit 201 through the communication control units 801 and 202. By repeating such processes, a process for creating instructions and a process for creating instructions and a process for managing instructions may be assigned to different apparatuses.

By using the above-described information processing apparatus and instructions execution apparatus, an icon desired by the user may be used even if a large number of icons are not prepared in advance. In addition, the same environment may be provided in terms of instructions even if the user changes an apparatus to be used.

OTHER EMBODIMENTS

Additional embodiments can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

The above-described embodiments are not limiting, and may be modified and altered in various ways without deviating from the spirit and the scope thereof. Therefore, the following claims are attached in order to make public the scope of the present disclosure.

According to the present disclosure, an icon of instructions to be displayed on a screen may be obtained from the outside and set.

This application claims the benefit of International Patent Application No. PCT/JP2012/069671, filed Aug. 2, 2012, which is hereby incorporated by reference herein in its entirety.

The invention claimed is:

1. An image processing apparatus configured to communicate with a first web server and a second web server, the image processing apparatus comprising:
   a scanner configured to scan a document to generate a document image;
   a memory; and
   a processor configured to communicate with the memory and to perform operations including:
   obtaining instructions data that describes a series of processes to be executed by the image processing apparatus, wherein the series of processes include at least a scan setting to be used for scanning the document with the scanner and a transmission setting to be used for transmitting the document image,
   extracting, from the transmission setting described in the instructions data, a first Uniform Resource Locator (URL) corresponding to a destination to which the document image is to be transmitted,
   acquiring, based on the extracted first URL, first favicon data held by the first web server corresponding to the extracted first URL,
   displaying a screen for allowing a user to input a second URL of the second web server that is different from the first web server in a case where the first favicon data is not acquired,
   acquiring, based on the second URL input in the screen, second favicon data held by the second web server corresponding to the second URL,
   setting the acquired first favicon data to an image of a button for executing the obtained instructions data in a case where the first favicon data is acquired,
   setting the acquired second favicon data to the image of the button for executing the obtained instructions data in a case where the second favicon data is acquired,
   displaying the image of the button to which the first favicon data or the second favicon data is set,
   generating, when the displayed button image is selected by a user, the document image by scanning the document with the scanner based on the scan setting described in the instructions data corresponding to the selected button image, and
   transmitting the generated document image to the destination corresponding to the extracted first URL of the transmission setting described in the instructions data corresponding to the selected button image.

2. The image processing apparatus according to claim 1, wherein the first favicon data is acquired by accessing a page of a Website that is identified by the extracted first URL.

3. A method for an image processing apparatus configured to communicate with a first web server and a second web server and including a scanner configured to scan a document to generate a document image, the method comprising:
   obtaining instructions data that describes a series of processes to be executed by the image processing apparatus, wherein the series of processes include at least a scan setting to be used for scanning the document with the scanner and a transmission setting to be used for transmitting the document image;
   extracting, from the transmission setting described in the instructions data, a first Uniform Resource Locator (URL) corresponding to a destination to which the document image is to be transmitted;
   acquiring, based on the extracted first URL, first favicon data held by the first web server corresponding to the extracted first URL;
   displaying a screen for allowing a user to input a second URL of the second web server that is different from the first web server in a case where the first favicon data is not acquired;
   acquiring, based on the second URL input in the screen, second favicon data held by the second web server corresponding to the second URL;
   setting the acquired first favicon data to an image of a button for executing the obtained instructions data in a case where the first favicon data is acquired;
   setting the acquired second favicon data to the image of the button for executing the obtained instructions data in a case where the second favicon data is acquired;
   displaying the image of the button to which the first favicon data or the second favicon data is set;
   generating, when the displayed button image is selected by a user, the document image by scanning the document with the scanner based on the scan setting described in the instructions data corresponding to the selected button image; and
   transmitting the generated document image to the destination corresponding to the extracted first URL of the transmission setting described in the instructions data corresponding to the selected button image.

4. The method according to claim 3, wherein acquiring includes acquiring the first favicon data by accessing a page of a Website that is identified by the extracted first URL.

5. A non-transitory computer-readable storage medium storing a program to cause a processor to perform a method for an image processing apparatus configured to communicate with a first web server and a second web server and including a scanner configured to scan a document to generate a document image, the method comprising:
   obtaining instructions data that describes a series of processes to be executed by the image processing apparatus, wherein the series of processes include at least a scan setting to be used for scanning the document with the scanner and a transmission setting to be used for transmitting the document image;
   extracting, from the transmission setting described in the instructions data, a first Uniform Resource Locator (URL) corresponding to a destination to which the document image is to be transmitted;
   acquiring, based on the extracted first URL, first favicon data held by the first web server corresponding to the extracted first URL;
   displaying a screen for allowing a user to input a second URL of the second web server that is different from the first web server in a case where the first favicon data is not acquired;
   acquiring, based on the second URL input in the screen, second favicon data held by the second web server corresponding to the second URL;
   setting the acquired first favicon data to an image of a button for executing the obtained instructions data in a case where the first favicon data is acquired;
   setting the acquired second favicon data to the image of the button for executing the obtained instructions data in a case where the second favicon data is acquired;
   displaying the image of the button to which the first favicon data or the second favicon data is set;
   generating, when the displayed button image is selected by a user, the document image by scanning the document with the scanner based on the scan setting described in the instructions data corresponding to the selected button image; and transmitting the generated document image to the destination corresponding to the extracted first URL of the transmission setting described in the instructions data corresponding to the selected button image.

* * * * *